(12) United States Patent
Goldenberg (10) Patent No.: US 10,976,892 B2
(45) Date of Patent: *Apr. 13, 2021

(54) LONG CLICK DISPLAY OF A CONTEXT MENU

(71) Applicant: Palantir Technologies Inc., Palo Alto, CA (US)

(72) Inventor: Joshua Goldenberg, Menlo Park, CA (US)

(73) Assignee: Palantir Technologies Inc., Denver, CO (US)

( * ) Notice: Subject to any disclaimer, the term of this patent is extended or adjusted under 35 U.S.C. 154(b) by 259 days.

This patent is subject to a terminal disclaimer.

(21) Appl. No.: 15/099,485

(22) Filed: Apr. 14, 2016

(65) Prior Publication Data
US 2016/0246457 A1    Aug. 25, 2016

Related U.S. Application Data

(63) Continuation of application No. 14/033,076, filed on Sep. 20, 2013, now Pat. No. 9,335,897.
(Continued)

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/03543* (2013.01); *G06F 3/0487* (2013.01); *G06F 3/04812* (2013.01); *G06F 3/04847* (2013.01)

(58) Field of Classification Search
CPC combination set(s) only.
See application file for complete search history.

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| AU | 2014208293 | 4/2018 |
| CN | 101729531 | 6/2010 |

(Continued)

OTHER PUBLICATIONS

Ontheropes, "Right Click disabled in Desktop and explorer—Fix", Jan. 3, 2011, Computer Hope, https://www.computerhope.com/forum/index.php?topic=114488.0, 3 pages.*

(Continued)

*Primary Examiner* — Anil N Kumar
(74) *Attorney, Agent, or Firm* — Knobbe Martens Olson & Bear LLP (57) ABSTRACT

In cases where the right mouse click operation to access a context menu is disabled, the techniques described in the disclosure may provide access to the context menu through a long click of the left mouse button. For example, the user may click and hold the left mouse button for at least a threshold period of time, and in response thereto, the user interface is updated to display the context menu. To indicate to the user how long it would take for the context menu to appear, an icon can be displayed next to the cursor, or as a part of the cursor. The icon can show the relative time left before the context menu is displayed (e.g., an elapsed and/or remaining portion of the threshold period of time, etc.).

18 Claims, 5 Drawing Sheets

Related U.S. Application Data (60) Provisional application No. 61/863,851, filed on Aug. 8, 2013.

(51) Int. Cl.
    *G06F 3/0481*      (2013.01)
    *G06F 3/0484*      (2013.01)
    *G06F 3/0487*      (2013.01)
    *G06F 3/0354*      (2013.01)

(56) References Cited

U.S. PATENT DOCUMENTS

| | | |
|---|---|---|
| 5,632,009 A | 5/1997 | Rao et al. |
| 5,670,987 A | 9/1997 | Doi et al. |
| 5,781,704 A | 7/1998 | Rossmo |
| 5,845,300 A | 12/1998 | Comer |
| 5,978,475 A | 11/1999 | Schneier et al. |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,253,203 B1 | 6/2001 | O'Flaherty et al. |
| 6,279,018 B1 | 8/2001 | Kudrolli et al. |
| 6,341,310 B1 | 1/2002 | Leshem et al. |
| 6,369,835 B1 | 4/2002 | Lin |
| 6,456,997 B1 | 9/2002 | Shukla |
| 6,549,944 B1 | 4/2003 | Weinberg et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,725,240 B1 | 4/2004 | Asad et al. |
| 6,775,675 B1 | 8/2004 | Nwabueze et al. |
| 6,807,569 B1 | 10/2004 | Bhimani et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,938,216 B1 | 8/2005 | Ishisaki |
| 6,976,210 B1 | 12/2005 | Silva et al. |
| 6,980,984 B1 | 12/2005 | Huffman et al. |
| 6,985,950 B1 | 1/2006 | Hanson et al. |
| 7,017,046 B2 | 3/2006 | Doyle et al. |
| 7,036,085 B2 | 4/2006 | Barros |
| 7,043,702 B2 | 5/2006 | Chi et al. |
| 7,055,110 B2 | 5/2006 | Kupka et al. |
| 7,069,586 B1 | 6/2006 | Winneg et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,225,468 B2 | 5/2007 | Waisman et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,546,245 B2 | 6/2009 | Surpin et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,640,173 B2 | 12/2009 | Surpin et al. |
| 7,703,021 B1 | 4/2010 | Flam |
| 7,712,049 B2 | 5/2010 | Williams et al. |
| 7,716,067 B2 | 5/2010 | Surpin et al. |
| 7,716,077 B1 | 5/2010 | Mikurak |
| 7,725,547 B2 | 5/2010 | Albertson et al. |
| 7,770,032 B2 | 8/2010 | Nesta et al. |
| 7,770,100 B2 | 8/2010 | Chamberlain et al. |
| 7,801,871 B2 | 9/2010 | Gosnell |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,010,886 B2 | 8/2011 | Gusmorino et al. |
| 8,015,487 B2 | 9/2011 | Roy et al. |
| 8,019,709 B2 | 9/2011 | Norton et al. |
| 8,024,778 B2 | 9/2011 | Cash et al. |
| 8,036,632 B1 | 10/2011 | Cona et al. |
| 8,082,172 B2 | 12/2011 | Chao et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,181,253 B1 | 5/2012 | Zaitsev et al. |
| 8,190,893 B2 | 5/2012 | Benson et al. |
| 8,196,184 B2 | 6/2012 | Amirov et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,239,668 B1 | 8/2012 | Chen et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,411,046 B2 | 4/2013 | Kruzensiki et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,620,641 B2 | 12/2013 | Farnsworth et al. |
| 8,646,080 B2 | 2/2014 | Williamson et al. |
| 8,676,597 B2 | 3/2014 | Buehler et al. |
| 8,676,857 B1 | 3/2014 | Adams et al. |
| 8,683,322 B1 | 3/2014 | Cooper |
| 8,689,108 B1 | 4/2014 | Duffield et al. |
| 8,707,185 B2 | 4/2014 | Robinson et al. |
| 8,713,467 B1 | 4/2014 | Goldenberg et al. |

(56) References Cited

U.S. PATENT DOCUMENTS

| | | |
|---|---|---|
| 8,726,379 B1 | 5/2014 | Stiansen et al. |
| 8,739,278 B2 | 5/2014 | Varghese |
| 8,742,934 B1 | 6/2014 | Sarpy, Sr. et al. |
| 8,745,516 B2 | 6/2014 | Mason et al. |
| 8,756,224 B2 | 6/2014 | Dassa et al. |
| 8,769,412 B2 | 7/2014 | Gill et al. |
| 8,781,169 B2 | 7/2014 | Jackson et al. |
| 8,782,794 B2 | 7/2014 | Ramcharran |
| 8,799,799 B1 | 8/2014 | Cervelli et al. |
| 8,799,812 B2 | 8/2014 | Parker |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,486 B2 | 10/2014 | Tamayo |
| 8,917,274 B2 | 12/2014 | Ma et al. |
| 8,924,872 B1 | 12/2014 | Bogomolov et al. |
| 8,931,043 B2 | 1/2015 | Cooper et al. |
| 8,937,619 B2 | 1/2015 | Sharma et al. |
| 9,021,260 B1 | 4/2015 | Falk et al. |
| 9,049,117 B1 | 6/2015 | Nucci et al. |
| 9,100,428 B1 | 8/2015 | Visbal |
| 9,335,897 B2 | 5/2016 | Goldenberg |
| 9,338,013 B2 | 5/2016 | Castellucci et al. |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095415 A1* | 7/2002 | Walker ............... G06F 21/6218 |
| 2002/0095658 A1 | 7/2002 | Shulman |
| 2002/0112157 A1 | 8/2002 | Doyle et al. |
| 2002/0116120 A1 | 8/2002 | Ruiz et al. |
| 2002/0130907 A1 | 9/2002 | Chi et al. |
| 2002/0147805 A1 | 10/2002 | Leshem et al. |
| 2002/0174201 A1 | 11/2002 | Ramer et al. |
| 2003/0039948 A1 | 2/2003 | Donahue |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0123139 A1 | 6/2004 | Aiello et al. |
| 2004/0143602 A1 | 7/2004 | Ruiz et al. |
| 2004/0153418 A1 | 8/2004 | Hanweck |
| 2004/0181554 A1 | 9/2004 | Heckerman et al. |
| 2004/0193600 A1 | 9/2004 | Kaasten et al. |
| 2004/0250124 A1 | 12/2004 | Chesla et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0157662 A1 | 7/2005 | Bingham et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0229256 A2 | 10/2005 | Banzhof |
| 2005/0246327 A1 | 11/2005 | Yeung et al. |
| 2005/0251786 A1 | 11/2005 | Citron et al. |
| 2005/0262556 A1 | 11/2005 | Waisman et al. |
| 2005/0275638 A1* | 12/2005 | Kolmykov-Zotov ........................ G06F 3/04883 345/179 |
| 2006/0026120 A1 | 2/2006 | Carolan et al. |
| 2006/0026170 A1 | 2/2006 | Kreitler et al. |
| 2006/0031928 A1 | 2/2006 | Conley et al. |
| 2006/0038774 A1* | 2/2006 | Mese ............... G06F 1/1616 345/156 |
| 2006/0045470 A1 | 3/2006 | Poslinski et al. |
| 2006/0059139 A1 | 3/2006 | Robinson |
| 2006/0069912 A1 | 3/2006 | Zheng et al. |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0149596 A1 | 7/2006 | Surpin et al. |
| 2006/0179003 A1 | 8/2006 | Steele et al. |
| 2006/0203337 A1 | 9/2006 | White |
| 2006/0212931 A1 | 9/2006 | Shull et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0259964 A1* | 11/2006 | Maldonado ........... G06F 21/604 726/16 |
| 2006/0265747 A1 | 11/2006 | Judge |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0011304 A1 | 1/2007 | Error |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0143851 A1 | 6/2007 | Nicodemus |
| 2007/0169063 A1* | 7/2007 | Bauman ................ G06F 9/453 717/162 |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0294643 A1 | 12/2007 | Kyle |
| 2007/0294766 A1 | 12/2007 | Mir et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0104407 A1 | 5/2008 | Horne et al. |
| 2008/0126951 A1 | 5/2008 | Sood et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0201580 A1 | 8/2008 | Savitzky et al. |
| 2008/0222295 A1 | 9/2008 | Robinson et al. |
| 2008/0222706 A1 | 9/2008 | Renaud et al. |
| 2008/0229422 A1 | 9/2008 | Hudis et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0103442 A1 | 4/2009 | Douville |
| 2009/0119309 A1 | 5/2009 | Gibson et al. |
| 2009/0125369 A1 | 5/2009 | Kloostra et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0179892 A1 | 7/2009 | Tsuda et al. |
| 2009/0222400 A1 | 9/2009 | Kupershmidt et al. |
| 2009/0222760 A1 | 9/2009 | Halverson et al. |
| 2009/0228701 A1 | 9/2009 | Lin |

(56) References Cited

U.S. PATENT DOCUMENTS

| | | |
|---|---|---|
| 2009/0234720 A1 | 9/2009 | George et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0328222 A1 | 12/2009 | Helman et al. |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0077481 A1 | 3/2010 | Polyakov et al. |
| 2010/0100963 A1 | 4/2010 | Mahaffey |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0179831 A1 | 7/2010 | Brown et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060753 A1 | 3/2011 | Shaked et al. |
| 2011/0060910 A1 | 3/2011 | Gornish et al. |
| 2011/0061013 A1 | 3/2011 | Bilicki et al. |
| 2011/0074811 A1 | 3/2011 | Hanson et al. |
| 2011/0078173 A1 | 3/2011 | Seligmann et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0202555 A1 | 8/2011 | Cordover et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0258158 A1 | 10/2011 | Resende et al. |
| 2011/0291851 A1 | 12/2011 | Whisenant |
| 2011/0310005 A1 | 12/2011 | Chen et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0066166 A1 | 3/2012 | Curbera et al. |
| 2012/0066296 A1 | 3/2012 | Appleton et al. |
| 2012/0079363 A1 | 3/2012 | Folting et al. |
| 2012/0079592 A1 | 3/2012 | Pandrangi |
| 2012/0084866 A1 | 4/2012 | Stolfo |
| 2012/0106801 A1 | 5/2012 | Jackson |
| 2012/0110633 A1 | 5/2012 | An et al. |
| 2012/0110674 A1 | 5/2012 | Belani et al. |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0169593 A1 | 7/2012 | Mak |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0218305 A1* | 8/2012 | Patterson ............ G06F 17/2235 345/652 |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284791 A1 | 11/2012 | Miller et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006725 A1 | 1/2013 | Simanek et al. |
| 2013/0019306 A1 | 1/2013 | Lagar-Cavilla et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0078943 A1 | 3/2013 | Biage et al. |
| 2013/0097482 A1 | 4/2013 | Marantz et al. |
| 2013/0097709 A1 | 4/2013 | Basavapatna et al. |
| 2013/0101159 A1 | 4/2013 | Chao et al. |
| 2013/0110876 A1 | 5/2013 | Meijer et al. |
| 2013/0111320 A1 | 5/2013 | Campbell et al. |
| 2013/0117651 A1 | 5/2013 | Waldman et al. |
| 2013/0139268 A1 | 5/2013 | An et al. |
| 2013/0150004 A1 | 6/2013 | Rosen |
| 2013/0157234 A1 | 6/2013 | Gulli et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0238616 A1 | 9/2013 | Rose et al. |
| 2013/0239217 A1 | 9/2013 | Kindler et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2014/0013451 A1 | 1/2014 | Kulka et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0059683 A1 | 2/2014 | Ashley |
| 2014/0068487 A1 | 3/2014 | Steiger et al. |
| 2014/0075545 A1* | 3/2014 | Winneg .................. G06F 21/52 726/16 |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0229422 A1 | 8/2014 | Jain et al. |
| 2014/0279824 A1 | 9/2014 | Tamayo |
| 2014/0283107 A1 | 9/2014 | Walton et al. |
| 2014/0316911 A1 | 10/2014 | Gross |
| 2014/0333651 A1 | 11/2014 | Cervelli et al. |

(56) References Cited

U.S. PATENT DOCUMENTS

| | | |
|---|---|---|
| 2014/0337772 A1 | 11/2014 | Cervelli et al. |
| 2014/0366132 A1 | 12/2014 | Stiansen et al. |
| 2015/0039565 A1 | 2/2015 | Lucas |
| 2015/0046791 A1 | 2/2015 | Isaacson |
| 2015/0046844 A1 | 2/2015 | Lee |
| 2015/0046845 A1 | 2/2015 | Lee |
| 2015/0046870 A1 | 2/2015 | Goldenberg |
| 2015/0128274 A1 | 5/2015 | Giokas |
| 2015/0188715 A1 | 7/2015 | Castellucci et al. |
| 2015/0229664 A1 | 8/2015 | Hawthorn et al. |
| 2015/0248489 A1 | 9/2015 | Solheim et al. |
| 2015/0248563 A1 | 9/2015 | Alfarano et al. |
| 2015/0261847 A1 | 9/2015 | Ducott et al. |
| 2015/0326601 A1 | 11/2015 | Grondin et al. |
| 2016/0004864 A1 | 1/2016 | Falk et al. |
| 2016/0028759 A1 | 1/2016 | Visbal |

FOREIGN PATENT DOCUMENTS

| | | |
|---|---|---|
| CN | 103281301 | 9/2013 |
| DE | 10 2014 103 482 | 9/2014 |
| EP | 1 672 527 | 6/2006 |
| EP | 1 962 222 | 8/2008 |
| EP | 2 551 799 | 1/2013 |
| EP | 2 778 977 | 9/2014 |
| EP | 2 778 983 | 9/2014 |
| EP | 2 779 082 | 9/2014 |
| EP | 2 835 745 | 2/2015 |
| EP | 2 835 770 | 2/2015 |
| EP | 2 846 241 | 3/2015 |
| EP | 2 892 197 | 7/2015 |
| EP | 2 897 051 | 7/2015 |
| EP | 2 963 578 | 1/2016 |
| EP | 2 985 974 | 2/2016 |
| EP | 3614247 | 2/2020 |
| GB | 2 516 155 | 1/2015 |
| NL | 2011642 | 8/2015 |
| WO | WO 00/009529 | 2/2000 |
| WO | WO 2005/010685 | 2/2005 |
| WO | WO 2005/104736 | 11/2005 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

Gnome, "Simulate a right mouse click", Feb. 25, 2013, The Gnome Project, https://help.gnome.org/users/gnome-help/stable/a11y-right-click.html.en, printed from web.archive.org Feb. 14, 2018, 2 pages.*
Gnome, "Simulate a right mouse click", Feb. 25, 2013, The Gnome Project, https://help.gnome.org/users/gnome-help/stable/a11y-right-click.htnl.en, printed from web.archive.org Feb. 14, 2018, 2 pages. (Year: 2013).*
Rizwan, "RightToClick: Enable Forbidden Right Click Options [Firefox Addon]," Aug. 10, 2010, retrieved from https://www.addictivetips.com/internet-tips/righttoclick-enable-forbidden-right-click-options-firefox-addon/ on Sep. 12, 2017, 8 pages. (Year: 2010).*
Gnome, "Simulate a right mouse click", Feb. 25, 2013, The Gnome Project, https://help.gnome.org/users/gnome-help/stable/a11y-right-click.html.en, printed from web.archive.org Feb. 14, 2018, 2 pages. (Year: 2013).*
Raj, "RightToClick—Best way to Override Disabled right clcik ,copy and paste Function", Apr. 3, 2013 (verified through page HTML source code), Publisher: IT'zGeek, https://www.itzgeek.com/tips-and-tricks/righttoclick-best-way-to-override-disabled-right-clcik-copy-and-paste-function.html (Year: 2013).*
Bhuyan et al., "Network Anomaly Detection: Methods, Systems and Tools" First Quarter 2014, IEEE, 34 pages.
Glaab et al., "EnrichNet: Network-Based Gene Set Enrichment Analysis," Bioinformatics 28.18 (2012): pp. i451-i457.
Zheng et al., "GOEAST: a web-based software toolkit for Gene Ontology enrichment analysis," Nucleic acids research 36.suppl 2 (2008): pp. W385-W363.
Notice of Allowance for U.S. Appl. No. 14/033,076 dated Mar. 11, 2016.
Official Communication for U.S. Appl. No. 14/223,918 dated Jun. 8, 2015.
Official Communication for U.S. Appl. No. 14/816,748 dated Apr. 1, 2016.
Official Communication for U.S. Appl. No. 14/970,317 dated Mar. 21, 2016.
Official Communication for U.S. Appl. No. 14/982,699 dated Mar. 25, 2016.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Manske, "File Saving Dialogs," http://www.mozilla.org/editor/ui_specs/FileSaveDialogs.html Jan. 20, 1999, pp. 7.
Olanoff, Drew, "Deep Dive With the New Google Maps for Desktop With Google Earth Integration, It's More Than Just a Utility," May 15, 2013, pp. 8, http://web.archive.org/web/20130515230641/http://techcrunch.com/2013/05/15/deep-dive-with-the-new-google-maps-for-desktop-with-google-earth-integration-its-more-than-just-a-utility/.
Palmas, et al., "An Edge-Bundling Layout for Interactive Parallel Coordinates," Proceedings of the 2014 IEEE Pacific Visualization Symposium, Mar. 2014, pp. 57-64.
Rouse, Margaret, "OLAP Cube," http://searchdatamanagement.techtarget.com/definition/OLAP-cube, Apr. 28, 2012, pp. 16.
Waters et al., "Building an Encrypted and Searchable Audit Log," Published Jan. 9, 2004, 11 pages, http://www.parc.com/content/attachments/building_encrypted_searchable_5059_parc.pdf.
International Search Report and Written Opinion in Application No. PCT/US2009/056703, dated Mar. 15, 2010.
Notice of Allowance for U.S. Appl. No. 14/223,918 dated Jan. 6, 2016.
Notice of Allowance for U.S. Appl. No. 14/473,860 dated Jan. 5, 2015.
Official Communication for U.S. Appl. No. 14/280,490 dated Jul. 24, 2014.
Official Communication for U.S. Appl. No. 14/479,863 dated Dec. 26, 2014.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/823,935 dated Dec. 4, 2015.
"Indicate long click option to user on Android," Dec. 21, 2011, retrieved from https://ux.stackexchange.com/questions/1257/indicate-long-click-option-to-user-on-android on Sep. 12, 2017.
"Mac OS X: Content Menu Pops Up w/ "Left Click"—mozillaZine Forums," MozillaZine, Nov. 12, 2005, retrieved from http://forums.mozillazine.org/viewtopic.php?f=38&t=340572 on Sep. 12, 2017, 11 pages.
"Make a long mouse-click register as a separate key," Aug. 1, 2012, retrieved from https://autohotkey.com/board/topic/84054-make-a-long-mouse-click-register-as-a-separate-key on Sep. 12, 2017, 4 pages.
Heddings, Lowell "Prevent Annoying Websites from Messing with the Right-Click Menu in Firefox," Jan. 19, 2009, retrieved from https://www.howtogeek.com/howto/internet/prevent-annoying-websites-from-messing-with-the-right-click-menu-in-firefox/ on Sep. 12, 2017, 5 pages.
Rizwan, "RightToClick: Enable Forbidden Right Click Options [Firefox Addon]," Aug. 10, 2010, retrieved from https://www.addictivetips.com/internet-tips/righttoclick-enable-forbidden-right-click-options-firefox-addon/ on Sep. 12, 2017, 8 pages.
Official Communication for European Patent Application No. 14180142.3 dated Sep. 20, 2017.

(56) References Cited

OTHER PUBLICATIONS

Notice of Acceptance for Australian Patent Application No. 2014208293 dated Apr. 11, 2018.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"Federated Database System," https://en.wikipedia.org/wiki/Federated_database_system&oldid=571954221, Sep. 7, 2013 as retrieved Jan. 27, 2015 in 6 pages.
"The FASTA Program Package," fasta-36.3.4, Mar. 25, 2011, pp. 29.
Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 2006, pp. 8.
Appacts, "Smart Thinking for Super Apps," http://www.appacts.com Printed Jul. 18, 2013 in 4 pages.
Apsalar, "Data Powered Mobile Advertising," "Free Mobile App Analytics" and various analytics related screen shots http://apsalar.com Printed Jul. 18, 2013 in 8 pages.
Baker et al., "The Development of a Common Enumeration of Vulnerabilities and Exposures," Presented at the Second International Workshop on Recent Advances in Intrusion Detection, Sep. 7-9, 1999, pp. 35.
Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Capptain—Pilot Your Apps, http://www.capptain.com Printed Jul. 18, 2013 in 6 pages.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung et al., "Dataplex: An Access to Heterogeneous Distributed Databases," Communications of the ACM, Jan. 1990, vol. 33, No. 1, pp. 70-80.
Conner, Nancy, "Google Apps: The Missing Manual," Sharing and Collaborating on Documents, May 1, 2008, pp. 93-97, 106-113 & 120-121.
Countly Mobile Analytics, http://count.ly/ Printed Jul. 18, 2013 in 9 pages.
Crosby et al., "Efficient Data Structures for Tamper-Evident Logging," Department of Computer Science, Rice University, 2009, pp. 17.
Delcher et al., "Identifying Bacterial Genes and Endosymbiont DNA with Glimmer," BioInformatics, vol. 23, No. 6, 2007, pp. 673-679.
Distimo—App Analytics, http://www.distimo.com/app-analytics Printed Jul. 18, 2013 in 5 pages.
FireEye—Products and Solutions Overview, http://www.fireeye.com/products-and-solutions Printed Jun. 30, 2014 in 3 pages.
FireEye, http://www.fireeye.com/ Printed Jun. 30, 2014 in 2 pages.
Flurry Analytics, http://www.flurry.com/ Printed Jul. 18, 2013 in 14 pages.
GIS-NET 3 Public—Department of Regional Planning. Planning & Zoning Information for Unincorporated LA County. Retrieved Oct. 2, 2013 from http://gis.planning.lacounty.gov/GIS-NET3Public/Viewer.html.
Google Analytics Official Website—Web Analytics & Reporting, http://www.google.com/analytics.index.html Printed Jul. 18, 2013 in 22 pages.
Goswami, Gautam, "Quite 'Writely' Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Elsevier Science, Sep. 2010, Ch. 4 & 10, pp. 53-67 & 143-164.
Hibbert et al., "Prediction of Shopping Behavior Using a Huff Model Within a GIS Framework," Healthy Eating in Context Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Hur et al., "SciMiner: web-based literature mining tool for target identification and functional enrichment analysis," Bioinformatics 25.6 (2009): pp. 838-840.
Kahan et al., "Annotea: An Open RDF Infrastructure for Shared WEB Annotations", Computer Networks, 2002, vol. 39, pp. 589-608.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, http://www.kontagent.com/ Printed Jul. 18, 2013 in 9 pages.
Lee et al., "A Data Mining and CIDF Based Approach for Detecting Novel and Distributed Intrusions," Lecture Notes in Computer Science, vol. 1907 Nov. 11, 2000, pp. 49-65.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, http://www.localytics.com/ Printed Jul. 18, 2013 in 12 pages.
Ma et al. "A New Approach to Secure Logging," ACM Transactions on Storage, vol. 5, No. 1, Article 2, Published Mar. 2009, 21 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mixpanel—Mobile Analytics, https://mixpanel.com/ Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Open Web Analytics (OWA), http://www.openwebanalytics.com/ Printed Jul. 19, 2013 in 5 pages.
Piwik—Free Web Analytics Software. http://piwik.org/ Printed Jul. 19, 2013 in 18 pages.

(56) References Cited

OTHER PUBLICATIONS

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
Sigrist, et al., "Prosite, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, http://statcounter.com/ Printed Jul. 19, 2013 in 17 pages.
TestFlight—Beta Testing on the Fly, http://testflightapp.com/ Printed Jul. 18, 2013 in 3 pages.
Trak.io, http://trak.io/ printed Jul. 18, 2013 in 3 pages.
UserMetrix, http://usermetrix.com/android-analytics printed Jul. 18, 2013 in 3 pages.
VirusTotal—About, http://www.virustotal.com/en/about/ Printed Jun. 30, 2014 in 8 pages.
Official Communication for European Patent Application No. 14199180.2 dated Jun. 22, 2015.
Official Communication for European Patent Application No. 14199180.2 dated Aug. 31, 2015.
Official Communication for European Patent Application No. 15175106.2 dated Nov. 5, 2015.
Official Communication for European Patent Application No. 15180985.2 dated Jan. 15, 2016.
Official Communication in British Application No. GB 1411984.6 dated Dec. 22, 2014.
Official Communication in British Application No. GB1408025.3 dated Nov. 6, 2014.
Official Communication in European Application No. 14180281.9 dated Jan. 26, 2015.
Official Communication in European Application No. 14187996.5 dated Feb. 12, 2015.
Official Communication in European Application No. EP 14158861.6 dated Jun. 16, 2014.
Official Communication in European Patent Application No. 14159464.8 dated Jul. 31, 2014.
Official Communication in European Search Report in Application No. 14180142.3 dated Feb. 6, 2015.
Official Communication in European Search Report in Application No. 14186225.0 dated Feb. 13, 2015.
Official Communication in European Search Report in Application No. 14189344.6 dated Feb. 20, 2015.
Official Communication in Great Britain Application No. 1404457.2 dated Aug. 14, 2014.
Official Communication in Great Britain Application No. 1413935.9 dated Jan. 27, 2015.
Official Communication in New Zealand Application No. 622513 dated Apr. 3, 2014.
Official Communication in New Zealand Application No. 622517 dated Apr. 3, 2014.
Official Communication in New Zealand Application No. 624557 dated May 14, 2014.
Official Communication in New Zealand Application No. 627061 dated Jul. 14, 2014.
Official Communication in New Zealand Application No. 627962 dated Aug. 5, 2014.
Official Communication in New Zealand Application No. 628150 dated Aug. 15, 2014.
Official Communication in New Zealand Application No. 628161 dated Aug. 25, 2014.
Official Communication in New Zealand Application No. 628263 dated Aug. 12, 2014.
Official Communication in New Zealand Application No. 628495 dated Aug. 19, 2014.
Official Communication in New Zealand Application No. 628585 dated Aug. 26, 2014.
Official Communication in New Zealand Application No. 628840 dated Aug. 28, 2014.
Official Communication for U.S. Appl. No. 14180142.3 dated Oct. 16, 2018.
"How to handle long click and right click events in Backbone JS," Stack Overflow, retrieved Feb. 28, 2019 from https://stackoverflow.com/questions/16772185/how-to-handle-long-click-and-right-click-events-in-backbone-js, 2 pages.
"Open With Long-Click," Opera addons, retrieved Feb. 28, 2019 from https://addons.opera.com/en/extensions/details/open-with-long-click/, 4 pages.
Notice of Allowance for U.S. Appl. No. 14/823,935 dated Apr. 25, 2016.
Notice of Allowance for U.S. Appl. No. 14/970,317 dated May 26, 2016.
Official Communication for U.S. Appl. No. 14/731,312 dated Apr. 14, 2016.
Official Communication for U.S. Appl. No. 14/816,748 dated May 24, 2016.
Official Communication for U.S. Appl. No. 14/923,712 dated Feb. 12, 2016.
Official Communication for U.S. Appl. No. 15/071,064 dated Jun. 16, 2016.
CLC, "How to Copy Text From a Protected Web Page," Oct. 21, 2014, available at https://www.youtube.com/watch?v=RPS0K4zJU3s, printed in 3 pages.
Gizmo's Freeware, "Firefox Extension of the Week (Enter This Restricted Zone!)," Jun. 23, 2013, available at https://www.techsupportalert.com/content/firefox-extension-week-enter-restricted-zone.htm, printed in 4 pages.
Official Communication for European Patent Application No. 19195196.1 dated Jan. 20, 2020, 11 pages.

\* cited by examiner

LONG CLICK DISPLAY OF A CONTEXT MENU

INCORPORATION BY REFERENCE TO ANY PRIORITY APPLICATIONS

This application is a continuation of U.S. patent application Ser. No. 14/033,076, filed Sep. 20, 2013, which application claims the benefit of U.S. Provisional Application No. 61/863,851, filed Aug. 8, 2013. The entire contents of all of the above-referenced applications are hereby incorporated by reference herein. Any and all applications for which a foreign or domestic priority claim is identified in the Application Data Sheet as filed with the present application are hereby incorporated by reference under 37 CFR 1.57.

TECHNICAL FIELD

The present disclosure relates to displaying context menus in user interfaces.

BACKGROUND

Many user interfaces may utilize a context menu to provide a set of options relating to the current state or context of an application or operation system (e.g., choices relating to a selected item in the user interface). The context menu may be accessed when the user clicks on the right button of a mouse. In certain situations, the context menu may not be accessed by clicking the right mouse button. For example, right click to access the context menu may be disabled for security purposes, or may not be available, e.g., as in web user interfaces.

SUMMARY

The systems, methods, and devices described herein each have several aspects, no single one of which is solely responsible for its desirable attributes. Without limiting the scope of this disclosure, several non-limiting features will now be discussed briefly.

In one embodiment, a method of providing a context menu in a user interface comprises: providing a user interface on a display device using one or more computer processors; determining, by a computing system having one or more computer processors, whether right click operation of a mouse to access a context menu is disabled, wherein the mouse comprises at least a right button and a left button, the right click operation being associated with the right button and a context menu operation being associated with the left button; and in response to determining that the right click operation of the mouse to access the context menu is disabled, performing by the computing system: detecting activation of the left button; displaying in the user interface indicia of a portion of a threshold time period that the left button has been activated; and in response to determining that the left button has been activated for at least the threshold time period, displaying the context menu in the user interface.

In another embodiment, a system for providing a context menu in a user interface comprises: computer hardware comprising one or more computer processors; and a storage device storing instructions configured for execution by the one or more computer processors in order to: provide a user interface on a display device, wherein a mouse in communication with the one or more computer processors comprises at least a right button and one other button, a right click operation being associated with the right button and a context menu operation being associated with the one other button; detect activation of the one other button; display in the user interface indicia indicating a portion of a threshold time period that the one other button has been activated; and in response to determining that the one other button has been activated for at least the threshold time period, display the context menu in the user interface.

In yet another embodiment, a non-transitory computer readable medium comprises instructions for providing a context menu in a user interface that cause a computer processor to: provide a user interface on a display device; determine whether right click operation of a mouse to access a context menu is disabled, wherein the mouse comprises at least a right button and one other button, the right click operation being associated with the right button and a context menu operation being associated with the one other button; and in response to determining that the right click operation of the mouse to access the context menu is disabled: detect activation of the one other button; and in response to determining that the one other button has been activated for at least a threshold time period, display the context menu in the user interface.

DETAILED DESCRIPTION OF SPECIFIC EMBODIMENTS

Overview

In cases where the right mouse click operation to access a context menu is disabled, the techniques described in the disclosure may provide access to the context menu through a long click of the left mouse button. For example, the user may click and hold the left mouse button for at least a threshold period of time, and in response thereto, the user interface is updated to display the context menu. To indicate to the user how long it would take for the context menu to appear, an icon can be displayed next to the cursor, or as a part of the cursor. The icon can show the relative time left before the context menu is displayed (e.g., an elapsed and/or remaining portion of the threshold period of time, etc.).

Figure 1:
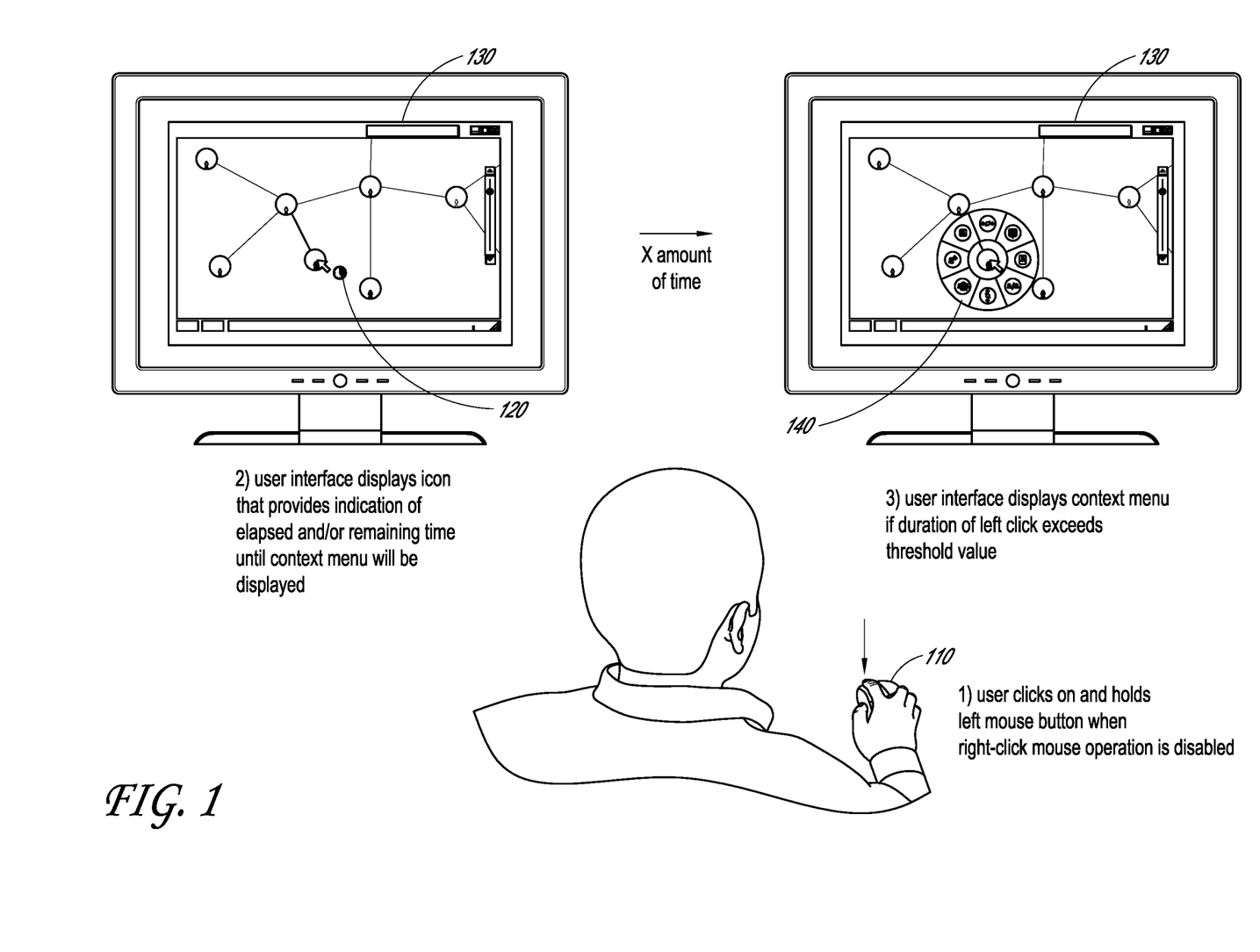
FIG. 1 illustrates a flow diagram for providing a context menu in a user interface when right click mouse operation to access the context menu is disabled.

FIG. 1 illustrates a flow diagram for providing a context menu 140 in a user interface 130 when the right click mouse operation (or other operation) configured to invoke the context menu 140 is disabled. A context menu may display a set of options or actions that are available for the currently selected item in an application or an operating system ("OS"), or for the current state or context of an application or an operating system. Accordingly, menu items shown in a context menu can vary depending on the item or the state the context menu is associated with. The context menu can generally be accessed or invoked by a click of the right mouse button ("right click mouse operation" or "right click operation").

However, as explained above, access to the context menu by right click mouse operation may be disabled (e.g., by an application, website, OS, etc.) or unavailable in certain cases. For example, an application or an OS relating to highly sensitive content may disable right click operation to prevent copying and pasting of content. Or a website or a web application may not provide context menus relating to specific data objects or menu items via right click operation. In such cases, the techniques described in this disclosure can provide the context menu in response to a long click of the left mouse button. A long mouse click may generally be longer than a mouse click for selecting an item or opening a menu in the user interface (e.g., a short click). What qualifies as a long click can be defined as appropriate, e.g., by an application, website, OS, etc. For example, an application or OS may define a long click by the amount of time a mouse button is pressed.

The techniques in this disclosure are described in terms of a left button and a right button of a mouse for illustrative purposes, but such description should not be considered to be limiting. The techniques described herein can apply to a mouse having more than two buttons as well as a mouse having one button.

Returning to FIG. 1, at event 1, the user clicks on and holds the left button of the mouse 110 when right click mouse operation to access the context menu 140 is disabled. FIG. 1 illustrates a two-button mouse 110 with a left button and a right button, but as explained above, the mouse 110 may have one button or may have three or more buttons, depending on the embodiment. In embodiments where the mouse 110 includes more than two buttons, the context menu 140 may be invoked through the long click of the left button or another mouse button that is not the right button (e.g., the middle button). The techniques described herein can also apply to devices that perform similar functions as a mouse 110, which can be used to invoke context menus 140.

At event 2, the user interface 130 displays an icon 120 that provides an indication of an elapsed and/or remaining time until the context menu 140 will be displayed in response to continued pressing of the left button. When the left button of the mouse 110 is pressed, the user may not know whether and/or when the context menu 140 will be displayed. Thus, the icon 120 can be displayed in the user interface 130 to provide an indication of how long it would take for the context menu 140 to appear in the user interface 130. The context menu 140 may appear in the user interface 130 after a certain amount of time passes (e.g., a threshold period of time), and the icon 120 can indicate a portion of the amount of time that has passed or remains. The icon 120 may have different shapes, such as a progress bar, a clock, an increasing number, a decreasing number, etc. The icon 120 may be displayed in close proximity to the cursor.

In one embodiment, the context menu slowly fades in as the pressing of the left mouse button approaches the threshold period of time. Thus, the user can see the context menu at a low opacity level initially (and may be able to determine whether the context menu really is necessary) and can wait for the context menu to be functional by continuing to hold the left mouse button until the context menu reaches full opacity with reference to the background user interface (e.g., when the threshold period of time has been reached).

At event 3, the user interface 130 displays the context menu 140 if the duration of the left click exceeds the threshold value. If the left click is long enough (e.g., held for the threshold period of time), the user interface 130 can display the context menu 140. The user interface 130 can terminate display of the icon 120 at the time, or immediately prior to, the context menu 140 is displayed. The user interface 130 may also terminate display of the icon 120 if the duration of the left click does not exceed the threshold value, and the left mouse button is released before reaching the threshold value.

Figure 2A:
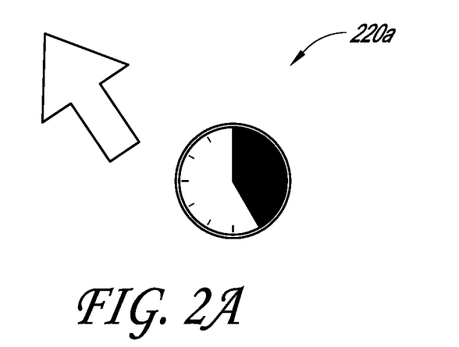
FIGS. 2A, 2B, and 2C illustrate various embodiments of an icon that indicates the progress until the context menu is displayed.
Figure 2B:
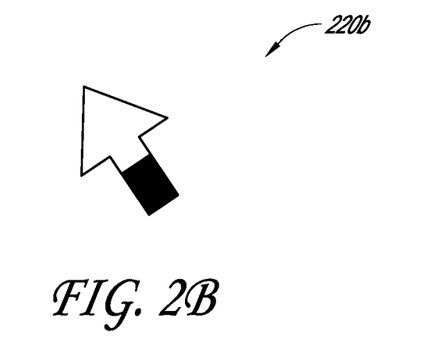
Figure 2C:
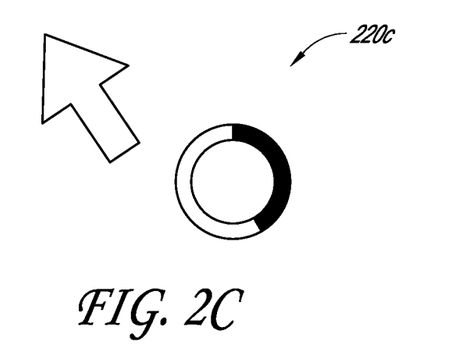

FIGS. 2A, 2B, and 2C illustrate some embodiments of the icon 120 in FIG. 1, which shows progress until the context menu 140 is displayed in the user interface 130. The icon 220 may be shown next to the cursor, or include the cursor as illustrated in FIG. 2B. The icon 220 can indicate progress by filling in the portion of the icon 220 that corresponds to the amount of time the left mouse button has been pressed with reference to the threshold time period. The icon 220 can also denote such portion using different colors.

FIG. 2A illustrates an icon 220a in the shape of a clock or timer. A portion of the clock or timer 220a can be filled in or distinguished in color to show the amount of time the left mouse button has been pressed. The clock icon 220a can be displayed next to the cursor. FIG. 2B illustrates an icon 220b that utilizes the cursor. The cursor icon 220b can show the portion of time the left button has been pressed by filling or otherwise changing appearance of a portion of the cursor relative to the remaining time left to reach the threshold time period. In FIG. 2B, the shape of the cursor is an arrow, but the cursor can have any shape. FIG. 2C illustrates an icon 220c in the shape of a ring. The portion of the ring icon 220c corresponding to the amount of time the left button has been pressed can be filled in. The exemplary embodiments of the icon 120 are provided for illustrative purposes and should not be considered to be limiting. The icon 120 may have any shape or form that can indicate how long it would take for the context menu to be displayed.

Figure 3:
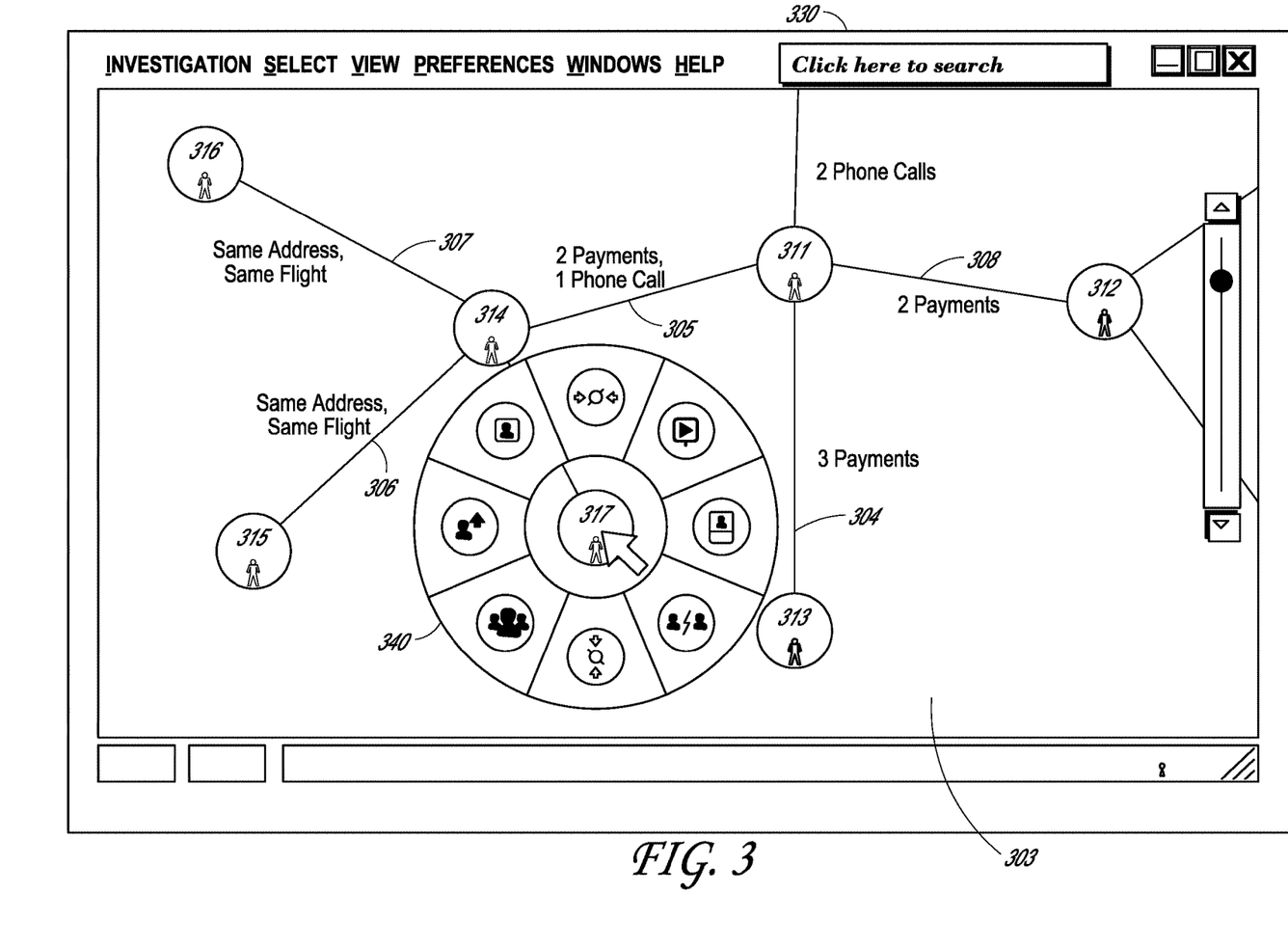
FIG. 3 illustrates one embodiment of a radial context menu.

FIG. 3 illustrates one embodiment of a radial context menu 340. The context menu 140 in FIG. 1 can have any shape, e.g., a list, a circle, a rectangle, etc. In one embodiment, the context menu 140 can have a circular or radial shape as shown in FIG. 3. The user interface 330 may display a radial context menu 340 in response to a long click of the left mouse button. The radial menu 340 may be in the form of a complete or a partial circle that includes one or more menu items. In some embodiments, the inner portion of the circle may not be a part of the radial menu 340, as shown in FIG. 3. For example, the radial menu 340 may be shaped like a ring. Each menu item can include a respective portion of the radial context menu 340. A menu item may have an icon or diagram associated with it and/or text associated with it.

Figure 4:
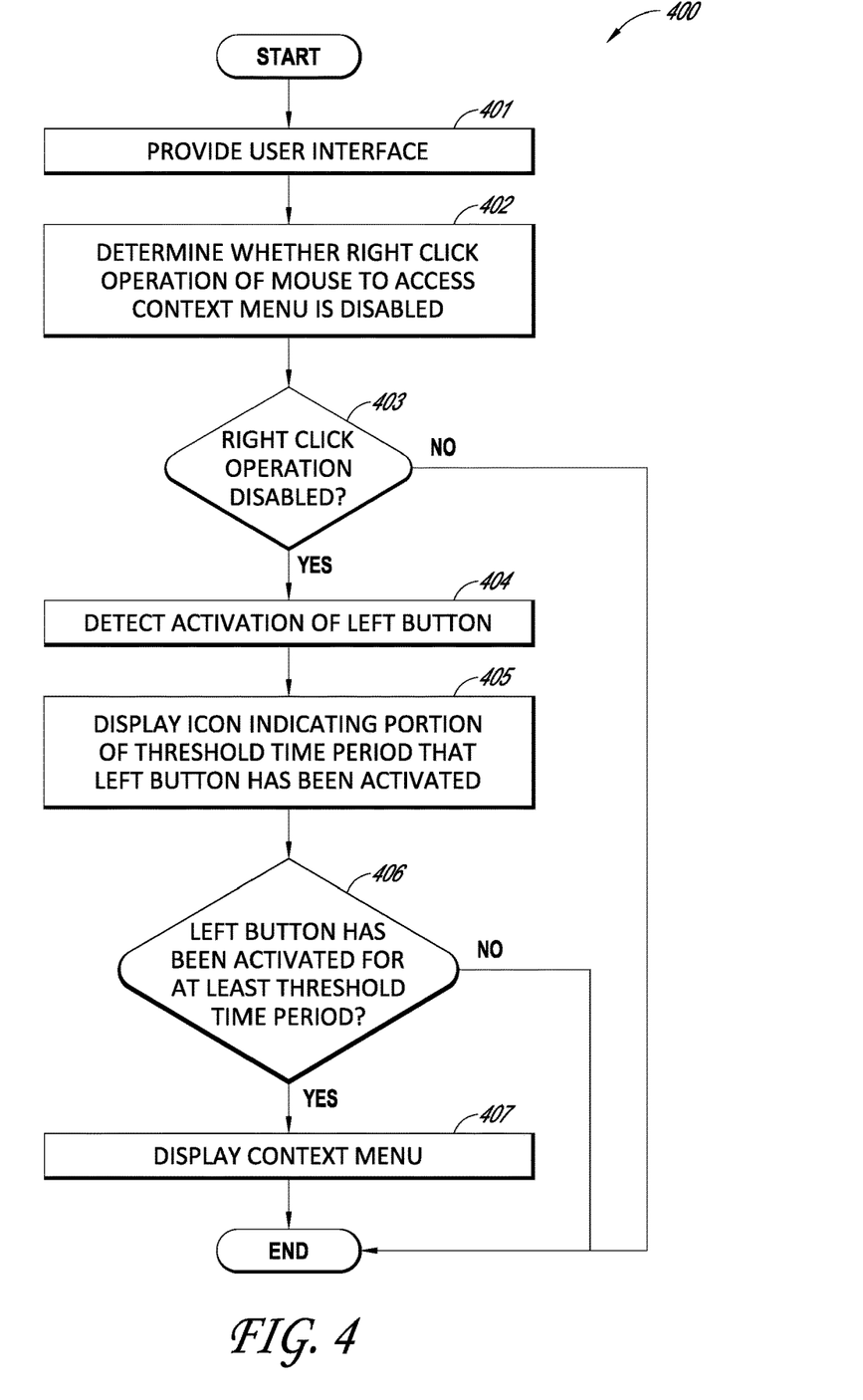
FIG. 4 illustrates a flowchart for providing a context menu when right click mouse operation to access the context menu is disabled, according to certain embodiments.

FIG. 4 illustrates a flowchart for providing a context menu when right-click mouse operation to access the context menu is disabled, according to certain embodiments. The process 400 is explained in connection with in FIG. 1, but may also apply to FIG. 3. Certain details relating to the process 400 are explained in more detail with respect to FIGS. 1-3. The process 400 may be implemented by a computer system 500 as described with respect to FIG. 5. Depending on the embodiment, the method of FIG. 4 may include fewer or additional blocks, and the blocks may be performed in an order that is different than illustrated.

At block 401, a user interface 130 is presented on a computing system, such as a display of a laptop or desktop computer of a data analyst. The user interface 130 may be a graphical user interface (GUI) as explained in detail below.

FIG. 3 illustrates one embodiment of the GUI that displays a graph, but any other user interface may be displayed.

At block 402, the process 400 determines whether the right click operation of a mouse 110 to access the context menu 140 is disabled. The right click operation may be disabled by an application, a website, an OS, etc. Such determination may be made by accessing settings or configurations relating to an application, a website, or an OS. The mouse 110 may be a one-button mouse, a two-button mouse, or a button with more than two buttons. For a mouse 110 with more than two buttons, the mouse button associated with invoking the context menu 140 may be the left button, or another button between the left button and the right button. For illustrative purposes, FIG. 4 is explained in terms of a left button and a right button of a mouse 110. The right click operation may be associated with the right button, and the context menu operation may be associated with the left button. The context menu operation may refer to a mouse click operation that is associated with invoking or accessing the context menu.

At block 403, if the right click operation of the mouse 110 is disabled, the process 400 detects activation of the left mouse button at block 404. For instance, the left mouse button may be activated by a left click of the mouse 110. The user can continue to activate the left mouse button by holding the left click. If the right click operation of the mouse 110 is not disabled, the process 400 may end without any further processing, and the context menu 140 may be accessed by the user right clicking on the user interface 130. In one embodiment, the process 400 provides an indication to the user that right-click operations of the mouse are not disabled, such as by providing a pop-up message such as "Please access the context menu using your right mouse button," in response to determining that the right click operation is not disabled at block 403.

At block 405, the process 400 displays an icon 120 and/or other indicia indicating a portion of the threshold time period that the left button has been activated. The icon 120 can appear next to the cursor as explained above. The icon 120 may be the cursor itself that indicates the portion of the threshold time period (e.g., the cursor that is filled in to reflect the amount of threshold time period that has passed, as in FIG. 2B). The icon 120 can have different shapes, depending on the embodiment.

Users may not want to see the icon 120 if the activation of the left button is not a long click. For brief activation of the left button, such as for a short click of the mouse 110, displaying the icon 120 immediately after detecting the activation of the left button may lead to the icon 120 appearing and suddenly disappearing from the user interface 130 each time the user clicks the left mouse button. Therefore, the process 400 may wait a certain period of time ("waiting period") prior to displaying the icon 120 in response to the activation of the left button. In one embodiment, such period of time may be a few milliseconds. For example, the waiting period can be between 1 and 10 milliseconds. In one embodiment, the waiting period is adjustable, such as by the user of the computing device. Similarly, in one embodiment, the threshold time period for display of the context menu 140 is adjustable, such as by the user. Additionally, in one embodiment, the waiting period is proportional to the current threshold time period, such that adjustment of the threshold time period automatically adjusts the waiting time period in a proportional manner. In some embodiments, the waiting period is longer than the duration of a short click of a mouse 110, where the short click is generally associated with selection of an item or a menu.

At block 406, if the left button has been activated for the threshold time period, the process 400 displays the context menu 140 at block 407. The threshold time period can be in the range of milliseconds or seconds. For example, the threshold time period may be between 1 and 5 seconds. Or the threshold time period may be in the range of 10 to 1000 milliseconds. The threshold time period can be determined appropriately by the user, an application, website, OS, etc. The context menu 140 can be a radial menu 340 as shown in FIG. 3 or any other context menu. If the left button has not been activated for the threshold time period, the process 400 may end without any further processing. In some embodiments, the process 400 may terminate displaying the icon 120.

Example Data Analysis Graphical User Interface (GUI)

As shown in FIG. 3, the properties, objects, and the links (e.g. relationships) between the objects can be visualized using a graphical user interface (GUI). For example, FIG. 3 displays a user interface showing a graph representation 303 of relationships (including relationships or links 304, 305, 306, 307, 308) between the data objects (including data objects 311, 312, 313, 314, 315, 316, 317) that are represented as nodes in the example of FIG. 3. Further details regarding such a data analysis system are included in U.S. Pat. No. 7,962,495, entitled "CREATING DATA IN A DATA STORE USING A DYNAMIC ONTOLOGY," the content of which is incorporated herein by reference in its entirety.

In order to facilitate an understanding of the example discussed with reference to FIG. 3, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Link: A connection between two data objects, based on, for example, a relationship, an event, and/or matching properties. Links may be directional, such as one representing a payment from person A to B, or bidirectional.

In the example GUI of FIG. 3, the data objects are person objects. In this example, the person nodes (associated with person data objects) may have relationships to other person nodes, for example, through payment objects. For example, relationship 304 is based on a payment associated with the individuals indicated in person data objects 311 and 313. The link 304 represents these shared payments (for example, the individual associated with data object 311 may have paid the individual associated with data object 313 on three occasions). These relationships may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of the payment.

In addition to visually showing relationships between the data objects, the user interface may allow various other manipulations. For example, the objects within a database may be searched using a search interface 320 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. However, certain of the manipulations may be available only through accessing a context menu associated with the software application. Thus, as noted above, if a particular computing environment, such as a browser setting, disables use of a command that is normally used to invoke a context menu (e.g., right clicking on a mouse), the systems and methods discussed herein for invoking the context menu using a long click may be very valuable in allowing the user to fully utilize functionality available in the software application.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
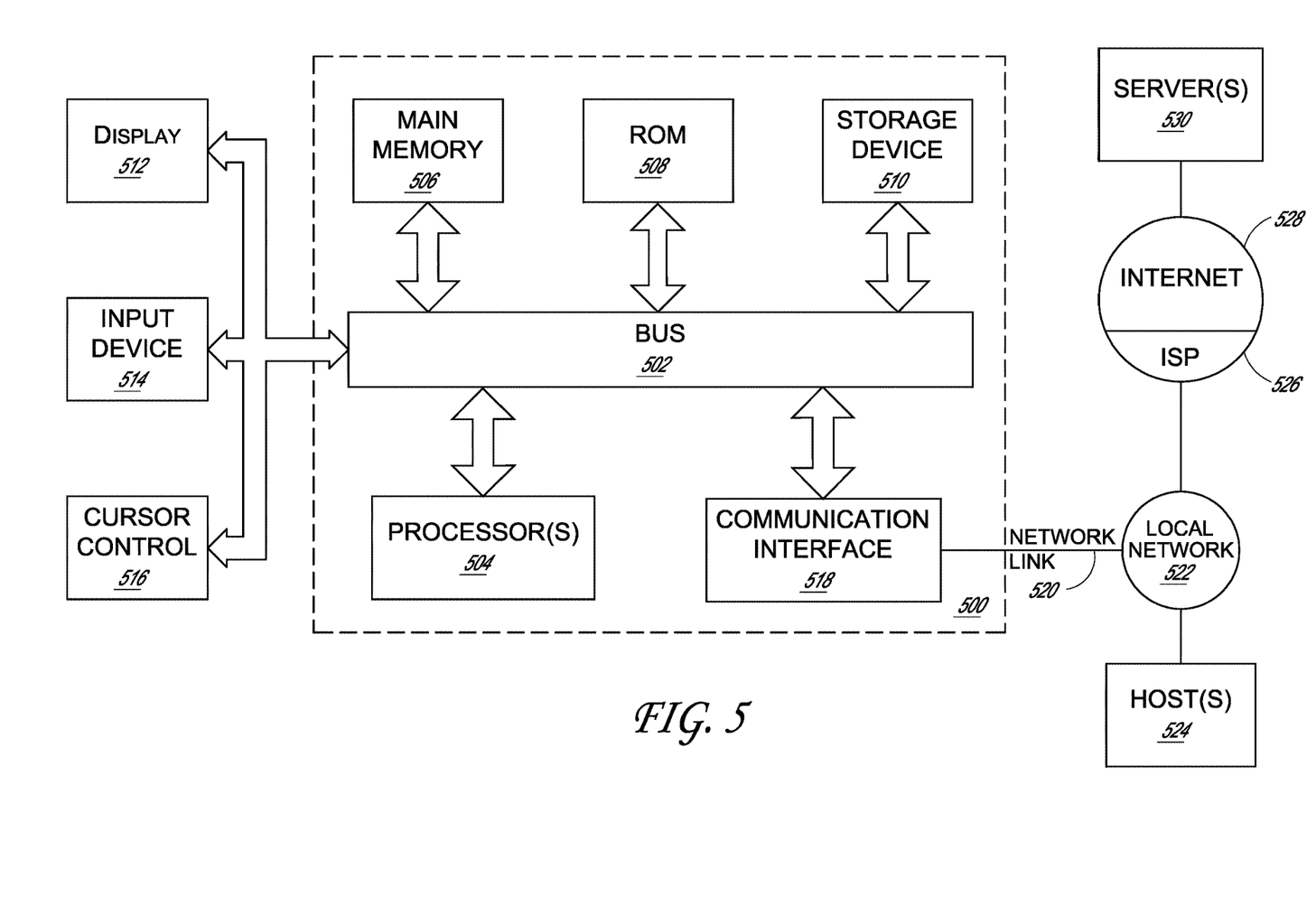
FIG. 5 illustrates a computer system with which certain methods discussed herein may be implemented.

For example, FIG. 5 is a block diagram that illustrates a computer system 500 upon which an embodiment may be implemented. For instance, the computer system 500 may execute software (e.g., standalone software applications, applications within browsers, network applications, etc.) that have right-click operations disabled, whether by the particular application, the operating system, the network administrator, or otherwise. Any of the methods discussed herein may be performed by the computing system 500 and/or a similar computing system having some or all of the components discussed with reference to FIG. 5.

Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of providing a context menu in a user interface, the method comprising:
by a computing system having one or more computer processors:
providing a user interface of a software application on a display device;
detecting a first click operation of a mouse;
determining, by accessing settings or configurations relating to an operating system, whether accessing a context menu by a second click operation of the mouse in the user interface is disabled by the operating system, wherein:
the mouse comprises at least a first button and a second button,
the first click operation is associated with the first button,
the second click operation is associated with the second button, and
the operating system is different from the software application; and
in response to determining that accessing the context menu by the second click operation is disabled by the operating system, and further in response to detecting the first click operation:
displaying in the user interface of the software application indicia of a portion of a threshold time period that the first click operation is active, wherein said displaying is performed only after a waiting period has lapsed since detecting the first click operation; and
in response to determining that the first click operation is active for at least the threshold time period, displaying the context menu in the user interface of the software application.

2. The method of claim 1, wherein the indicia depicts one or more of: a clock that indicates the portion of the threshold time period, a cursor that indicates the portion of the threshold time period, or a circle that indicates the portion of the threshold time period.

3. The method of claim 1 further comprising:
by the computing system having one or more computer processors:
further in response to determining that accessing the context menu by the second click operation is disabled:
in response to determining that the first click operation is deactivated before the threshold time period, terminating display of the indicia.

4. The method of claim 1, wherein the waiting period is shorter than the threshold time period.

5. The method of claim 1, wherein the waiting period is proportional to the threshold time period.

6. The method of claim 1, wherein the threshold time period is longer than a duration of a click of the mouse for selecting an item in the user interface or for opening a menu in the user interface.

7. The method of claim 1, wherein the display of the context menu and the display of the indicia overlap at least in part.

8. The method of claim 1, wherein the context menu is a radial menu and comprises one or more menu items.

9. A system comprising:
computer hardware comprising one or more computer processors;
a mouse in communication with the one or more computer processors and comprising at least a first button and a second button; and
a storage device storing instructions executable by the one or more computer processors to:
provide a user interface of a particular software application on a display device;
detect activation of the first button;
determine, by accessing settings or configurations relating to an operating system different from the particular software application, a context menu operation in the user interface associated with the second button is disabled by the operating system different from the particular software application; and in response to determining the context menu operation associated with the second button is disabled by the operating system, and further in response to detecting activation of the first button:

display in the user interface of the particular software application indicia indicating a portion of a threshold time period that the first button has been activated, wherein said displaying is performed only after a waiting period has lapsed since a user activated the first button; and in response to determining that the first button has been activated for at least the threshold time period, display the context menu in the user interface of the particular software application.

10. The system of claim 9, wherein the indicia depicts one or more of: a clock that indicates the portion of the threshold time period, a cursor that indicates the portion of the threshold time period, or a circle that indicates the portion of the threshold time period.

11. The system of claim 9, wherein the instructions are further executable by the one or more computer processors to:

in response to determining that the first button has been not been activated before the threshold time period has elapsed, terminate display of the indicia.

12. The system of claim 9, wherein the waiting period is shorter than the threshold time period.

13. The system of claim 12, wherein the threshold time period is longer than a duration of a click of the mouse for selecting an item in the user interface or for opening a menu in the user interface.

14. The system of claim 9, wherein the context menu is a radial menu and comprises one or more menu items.

15. A non-transitory computer readable medium comprising instructions executable by a computer processor to:

provide a user interface of a software application on a display device;

detect a first click operation of a mouse;

determine, by accessing settings or configurations relating to an operating system, whether a second click operation of a mouse to access a context menu in the user interface is disabled by the operating system, wherein:

the mouse comprises at least a first button and second button, the first click operation is associated with the first button, the second click operation is associated with the second button, and the operating system is different from the software application; and in response to determining that the second click operation to access the context menu is disabled by the operating system, and that the first click operation is active for at least a threshold time period:

display in the user interface indicia of a portion of a threshold time period that the first click operation is active, wherein said displaying is performed only after a waiting period has lapsed since detecting the first click operation; and display the context menu in the user interface of the software application.

16. The non-transitory computer readable medium of claim 15, wherein the context menu is a radial menu and comprises one or more menu items.

17. The non-transitory computer readable medium of claim 15, wherein the instructions are further executable by the computer processor to:

further in response to determining that the second click operation to access the context menu is disabled:

in response to determining that the first click operation is deactivated before the threshold time period has lapsed, terminate display of the indicia.

18. The non-transitory computer readable medium of claim 17, wherein the waiting period is shorter than the threshold time period.

* * * * *